US009888267B2

(12) United States Patent
Compton

(10) Patent No.: US 9,888,267 B2
(45) Date of Patent: Feb. 6, 2018

(54) CONTENT STORAGE METHOD AND SYSTEM

(71) Applicant: Comcast Cable Communications, LLC, Philadelphia, PA (US)

(72) Inventor: Charles L. Compton, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/166,426

(22) Filed: Jan. 28, 2014

(65) Prior Publication Data

US 2014/0143816 A1 May 22, 2014

Related U.S. Application Data

(60) Division of application No. 11/231,466, filed on Sep. 21, 2005, now abandoned, which is a
(Continued)

(51) Int. Cl.
*H04N 7/173* (2011.01)
*H04N 21/231* (2011.01)
(Continued)

(52) U.S. Cl.
CPC ...... *H04N 21/23106* (2013.01); *H04H 60/27* (2013.01); *H04N 7/17309* (2013.01);
(Continued)

(58) Field of Classification Search
USPC ............................................. 725/88; 426/88
See application file for complete search history.

(56) References Cited

U.S. PATENT DOCUMENTS 5,357,276 A 10/1994 Banker et al.
5,371,551 A 12/1994 Logan et al.
(Continued)

FOREIGN PATENT DOCUMENTS

WO 0058967 A1 10/2000
WO 03019932 A1 3/2003

OTHER PUBLICATIONS

Something is about to change the way you watch TV, TIVO, Inc., Sunnyvale, CA.
(Continued)

*Primary Examiner* — Junior Mendoza
(74) *Attorney, Agent, or Firm* — Banner & Whitcoff, Ltd.

(57) ABSTRACT

A content storage method and system for use in a content distribution network are provided. A personal file locker is established on the network for a user. A content-storage-request database is established. The database tracks requests by the user for placing video programs into the user's file locker for personal use by the user. Upon the broadcasting of a video program for which there exists a request by the user to place the video program into the user's file locker, the requested video program is stored in the user's file locker. The stored video program is then made available to the user for viewing. Alternative approaches to content storage methods and systems are also described, including the use of a buffer enhancement to enable the performance of operations on "live" television.

19 Claims, 6 Drawing Sheets

Related U.S. Application Data continuation-in-part of application No. 10/806,251, filed on Mar. 22, 2004, now abandoned.

(51) Int. Cl.

| | | |
|---|---|---|
| *H04H 60/27* | (2008.01) | |
| *H04N 21/24* | (2011.01) | |
| *H04N 21/258* | (2011.01) | |
| *H04N 21/2747* | (2011.01) | |
| *H04N 21/472* | (2011.01) | |
| *H04N 21/658* | (2011.01) | |
| *H04N 21/6587* | (2011.01) | |
| *H04H 60/23* | (2008.01) | |
| *H04H 60/39* | (2008.01) | |

(52) U.S. Cl.
CPC ..... *H04N 7/17336* (2013.01); *H04N 21/2408* (2013.01); *H04N 21/25866* (2013.01); *H04N 21/25875* (2013.01); *H04N 21/2747* (2013.01); *H04N 21/47214* (2013.01); *H04N 21/6581* (2013.01); *H04N 21/6587* (2013.01); *H04H 60/23* (2013.01); *H04H 60/39* (2013.01)

(56) References Cited

U.S. PATENT DOCUMENTS

| | | | |
|---|---|---|---|
| 5,477,263 A | 12/1995 | O'Callaghan et al. | |
| 5,548,340 A | 8/1996 | Bertram | |
| 5,555,277 A | 9/1996 | Lawrence et al. | |
| 5,594,491 A | 1/1997 | Hodge et al. | |
| 5,608,448 A | 3/1997 | Smoral et al. | |
| 5,682,597 A | 10/1997 | Ganek et al. | |
| 5,751,282 A | 5/1998 | Girard et al. | |
| 5,790,174 A | 8/1998 | Richard, III et al. | |
| 5,832,287 A | 11/1998 | Atalla | |
| 5,940,738 A | 8/1999 | Rao | |
| 5,956,488 A | 9/1999 | Suzuki | |
| 6,732,158 B1 | 5/2004 | Hesselink et al. | |
| 6,757,906 B1 | 6/2004 | Look et al. | |
| 7,017,174 B1 | 3/2006 | Sheedy | |
| 7,434,242 B1 | 10/2008 | Goode | |
| 7,640,566 B1 | 12/2009 | Taylor et al. | |
| 2001/0047516 A1 | 11/2001 | Swain et al. | |
| 2002/0059621 A1 | 5/2002 | Thomas et al. | |
| 2002/0124099 A1 | 9/2002 | Srinivasan et al. | |
| 2002/0124262 A1 | 9/2002 | Basso et al. | |
| 2002/0174430 A1* | 11/2002 | Ellis et al. .................. 725/46 |
| 2002/0177449 A1* | 11/2002 | McDonnell et al. ......... 455/456 |
| 2003/0149988 A1 | 8/2003 | Ellis et al. | |
| 2003/0208767 A1 | 11/2003 | Williamson et al. | |
| 2004/0078829 A1 | 4/2004 | Patel et al. | |
| 2004/0111640 A1* | 6/2004 | Baum ................ H04L 61/2015 726/13 |
| 2005/0022242 A1 | 1/2005 | Rosetti et al. | |
| 2005/0044570 A1 | 2/2005 | Poslinski | |
| 2005/0120377 A1 | 6/2005 | Carlucci et al. | |
| 2006/0271949 A1* | 11/2006 | Perry ................ H04B 7/18547 725/25 |
| 2009/0138922 A1 | 5/2009 | Thomas et al. | |
| 2009/0222875 A1 | 9/2009 | Cheng et al. | |
| 2013/0104176 A1* | 4/2013 | Rossetti et al. .................. 725/88 |
| 2014/0201793 A1* | 7/2014 | Walker et al. .................. 725/45 |

OTHER PUBLICATIONS

Replay TV will absolutely, unequivocally shatter the myth that you have to watch television according to someone else's clock. Replay Networks, Inc., Palo Alto, CA.

\* cited by examiner

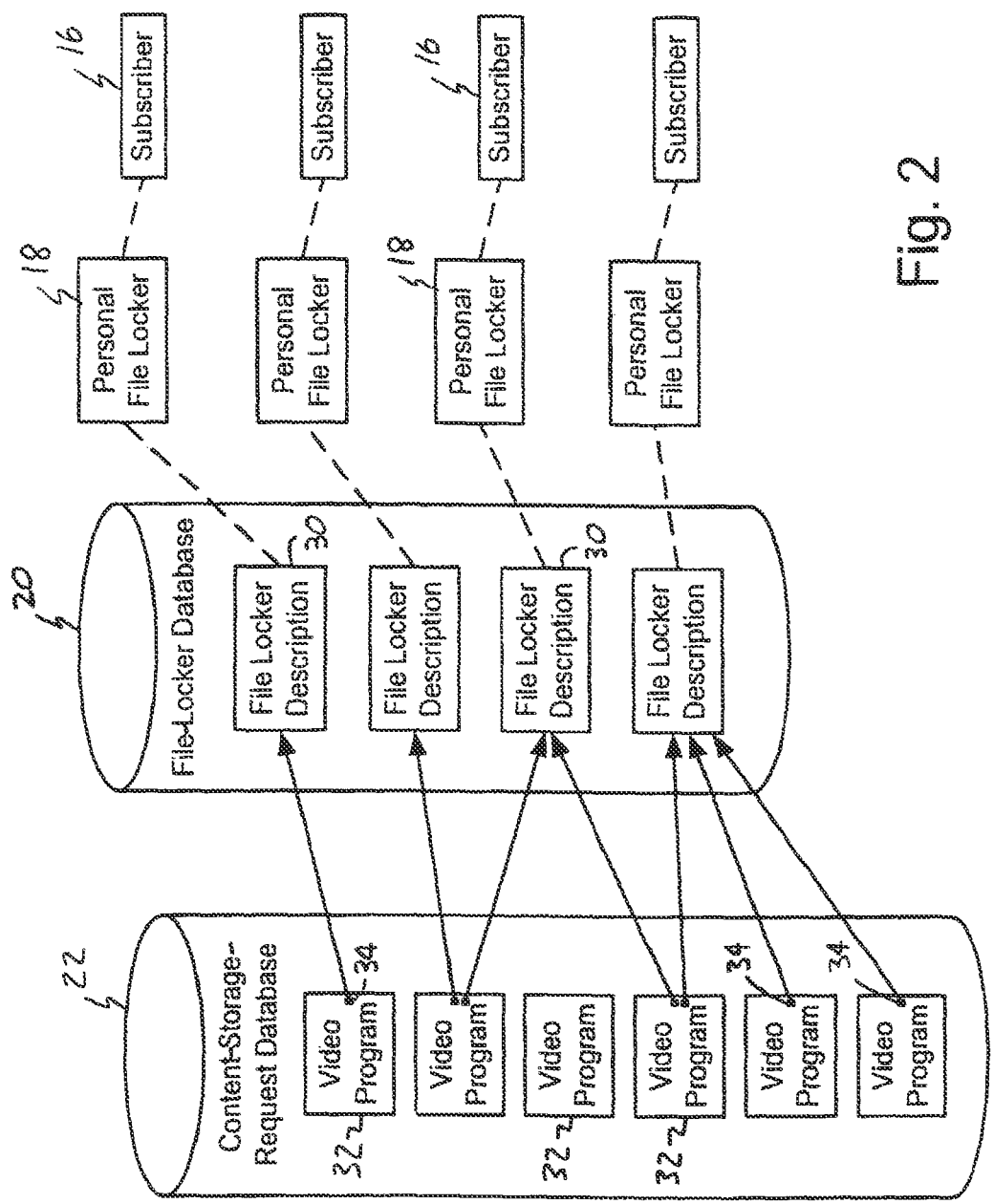

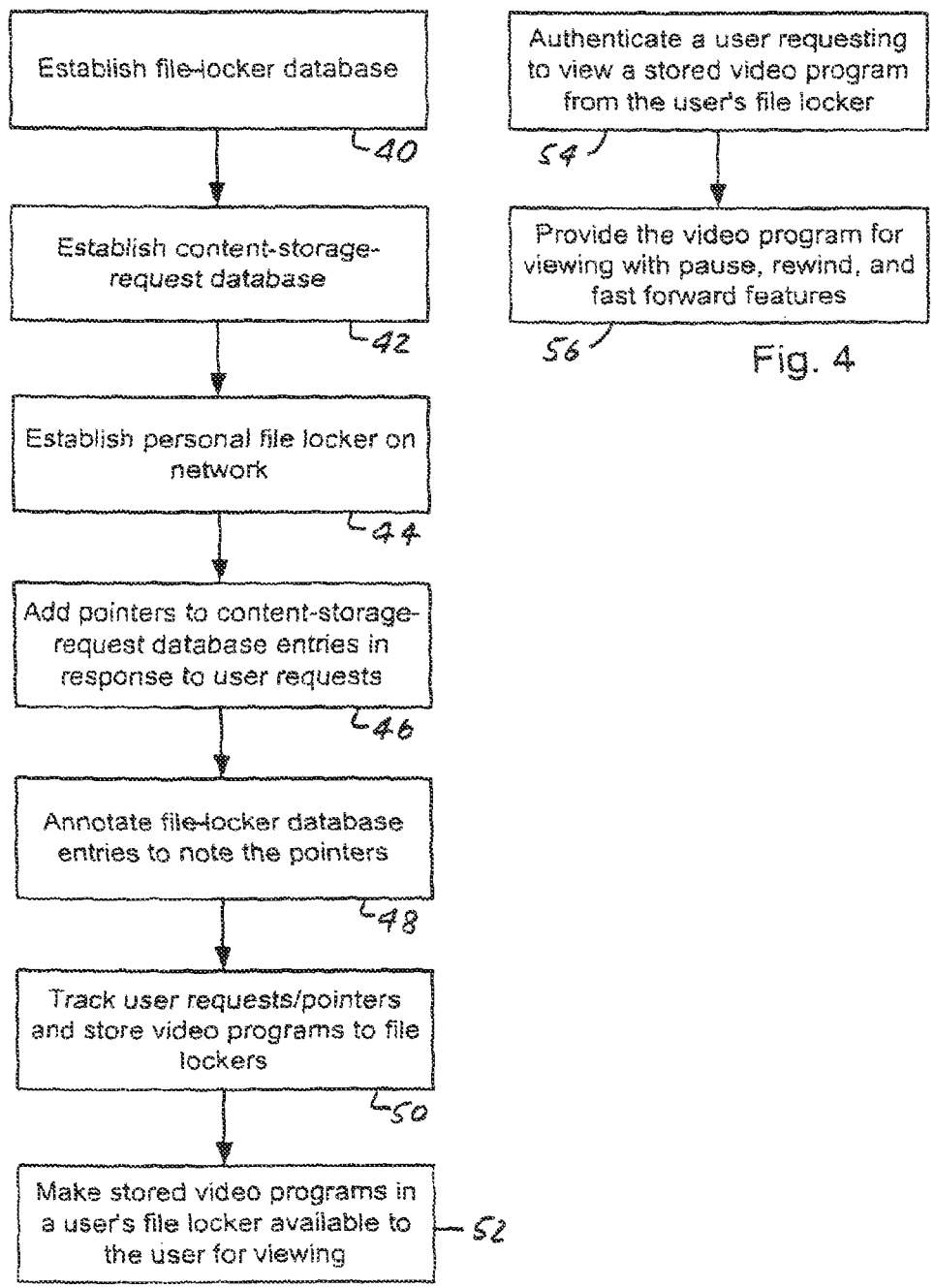

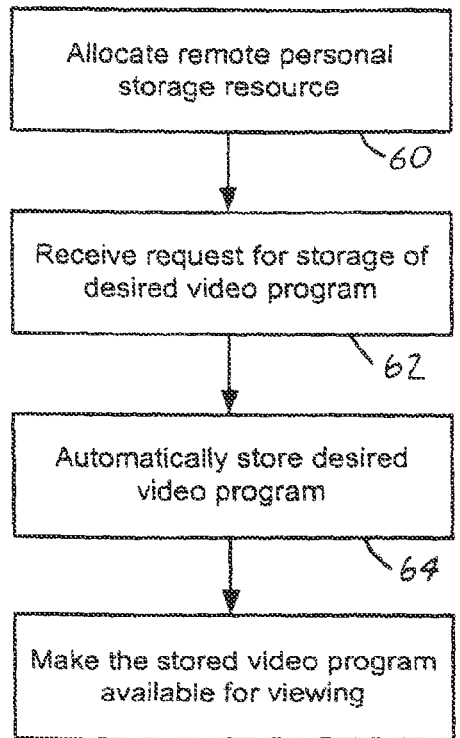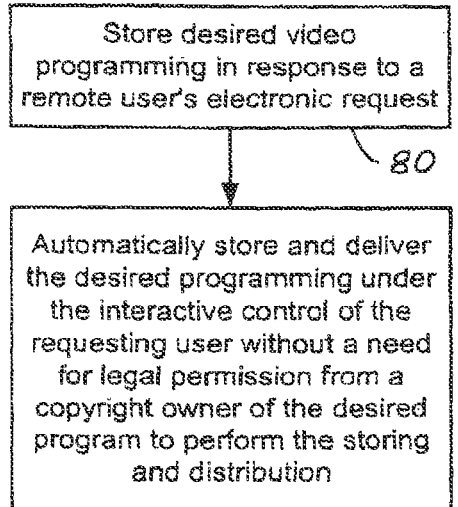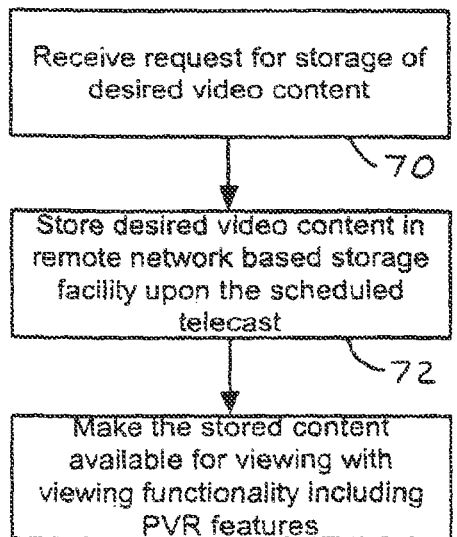

CONTENT STORAGE METHOD AND SYSTEM

CROSS-REFERENCE TO RELATED APPLICATIONS

This application is a divisional of U.S. application Ser. No. 11/231,466, filed on Sep. 21, 2005, which is a continuation-in-part of U.S. application Ser. No. 10/806,251, filed on Mar. 22, 2004.

BACKGROUND OF THE INVENTION

Field of the Invention

The invention relates to content distribution techniques and to personal video recorders (PVRs).

Background Art

The video cassette recorder (VCR) has been used for many years to allow users to record video programming to tape for personal use. Most modern video cassette recorders (VCRs) include a programmable memory to allow users to program the VCR in advance to later record a particular program. In this way, at the programmed time, the VCR tunes to the programmed channel and records the present video programming to tape. Over time, the VCR programmable memory feature has been enhanced to simplify programming.

Today, many viewers have turned to the personal video recorder (PVR) to record video programming for personal use. The PVR usually includes a hard disk drive and records video programming as digital video files on the hard disk drive. The PVR is able to provide all of the functionality associated with the traditional VCR, and provide some additional capabilities. One of these additional capabilities that has become quite popular is the ability to pause, rewind, and fast forward live broadcast programming.

Existing PVRs have been quite successful, but some have perceived certain disadvantages associated with the PVR. U.S. Pub. No. 2003/0208767 A1 enumerates some perceived disadvantages of the PVR and describes network-based interactive programming and services. All content is recorded at the headend and a content license approach is utilized where a user may reserve programs.

SUMMARY OF THE INVENTION

It is an object of the invention to provide an improved content storage method that utilizes a file locker-based approach. A user has a personal file locker on the network. When content is stored in the user's file locker, it is available for the user to watch. This innovative file locker-based approach provides improvements over the existing PVR by, for example, providing added flexibility and economy of scale. At the same time, this innovative file locker-based approach may avoid some of the limitations associated with a content license approach. In this way, the personal file locker provides a solution that is not comprehended by the prior art.

In carrying out the invention, a content storage method is provided for use in a content distribution network. The content distribution network provides broadcast video programming over the network to a plurality of users in accordance with a broadcasting schedule. The method comprises establishing a personal file locker on the network for a user. The file locker includes network storage space allocated for personal use by the user. The method further comprises establishing a content-storage-request database. The database tracks requests by the user for placing broadcast video programs into the user's file locker for personal use by the user. Requested content is stored in the user's file locker upon broadcast thereof and is thereafter made available to the user. Upon a request to view by the user, content stored in the user's file locker may be viewed. In this way, the invention provides a content storage area or file locker that a user can manage as if it were in his/her home. Operations supported include adding content, accessing content, and removing content.

It is appreciated that the file locker-based approach provided by the invention provides flexibility and economy of scale by implementing a personal file locker for the user on the network. It is further appreciated that the file locker-based approach provided by the invention provides a personal storage-space allocation for personal use by the user and in this way may avoid some of the limitations associated with a content license approach. The invention provides an improved content storage method that provides the flexibility and economy of scale of a network solution, and provides the personal use and management of an in-home solution, brought together in the file locker-based method.

At a more detailed level, the invention comprehends many possible features as further described below. The personal file locker may be established in any suitable way such as a directory or other file system/volume construct that is created to hold the user's content. A database entry in a file-locker database notes the details of the file locker. It is also to be appreciated that the content-storage-request database may be established in any suitable way. In a suitable approach, the content-storage-request database has entries corresponding to scheduled video programs, and a content-storage request by the user results in the addition of a pointer to the content-storage-request database entry for the requested program. The pointer points to the requesting user's file locker, or more specifically, points to the user's record in the file-locker database. When the pointer is added, the user's record in the file-locker database is also annotated so that the requests for that file locker can be tracked.

In the approach just described, a request by the user to delete a previous content-storage request is handled by removing the previously added pointer and removing the corresponding annotation.

Further, it is appreciated that the invention contemplates storing a requested video program to the user's file locker upon broadcast of the video program. It is further appreciated that the invention comprehends the storing of a requested video program to the user's file locker upon the general making of the video program available to the end user in any suitable fashion.

With regard to storing the video program in the user's file locker, it is appreciated that any suitable data storage technique may be utilized to effectively get the data available at the appropriate file lockers. With regard to the later viewing of the stored video program, content viewing requests are authenticated to identify which subscriber is making the request so that access to a subscriber's file locker is limited to that subscriber. Preferably, the user may utilize pause, rewind, and fast forward features while viewing.

Further, in carrying out the invention, a content storage system for use in a content distribution network is provided. The content distribution network provides broadcast video programming over the network to a plurality of users in accordance with a broadcasting schedule. The system comprises a personal file locker on the network for a user. The file locker is a construct created to hold the user's content and includes network storage space allocated for personal use by the user. The system further comprises a content-storage-request database for tracking requests by the user for placing broadcast video programs into the user's file locker for personal use by the user. The system further comprises computer instructions executable by a computer on the network. Upon the broadcasting of a video program for which there exists a request by the user to place the video program into the user's file locker, the computer instructions direct the storage of the video program in the user's file locker, and make the stored video program available to the user for viewing.

The system may incorporate any of the various aspects of the content storage methods provided. As appropriate, computer instructions executable by a computer on the network are utilized to carry out various aspects of the invention. It is appreciated that the implementation of computer instructions executable by a computer may be achieved in any suitable way. In addition, it is appreciated that the content storage systems and methods may be used in other arrangements where broadcast programming is provided over a network and are not strictly limited to broadcast video programming arrangements.

Further, in carrying out the invention, a content storage method is provided in which a plurality of personal file lockers are established on the network for a plurality of users. Each file locker includes network storage space allocated for personal use by the corresponding user. The method further comprises establishing a content-storage-request database for tracking requests by the plurality of users for placing broadcast video programs into their file lockers for personal use. The method further comprises, upon the broadcasting of a video program for which there exists at least one request by a user to place the program into the user's file locker, storing that video program in each requesting user's file locker. The stored video program is made available for viewing by each user whose file locker received the video program.

In another aspect of the invention, a content storage system comprising a plurality of personal file lockers on the network for a plurality of users is provided. In the system, computer instructions executable by a computer on the network are utilized to store video programs in appropriate file lockers and make the stored video programs available for viewing by users.

In addition to the various approaches described above for carrying out the invention in ways that involve providing content storage methods and systems that use a file locker-based approach, instantiation of the invention may take place in alternative ways and involve independent alternative approaches to carrying out the invention to achieve independent alternative embodiments of the invention. Thus, the invention as a whole comprehends various different alternative and independent approaches for carrying out the various concepts involved.

In carrying out the invention in a first alternative approach, a method for time-shifted viewing of content for use in a content distribution network is provided. The content distribution network delivers a plurality of broadcast video programs over the network to a plurality of viewers in accordance with a broadcast schedule. The method comprises allocating a remote personal storage resource on the network for a user. The method further comprises receiving a request by the user for storage of a desired one or more of the broadcast video programs. The method further comprises, only if the request is received no later than a scheduled broadcast of the desired program, in response to the request automatically storing the desired video program in the user's remote personal storage resource upon the scheduled broadcasting of the desired video program. The method further comprises automatically making the stored video program available to the user over the network for viewing at a subsequent time specified by the user.

At a more detailed level, the method in the first alternative approach comprehends further features. For example, a quantity limit on how much total content can be stored for the user in the remote personal storage resource may be established. For example, one or more limits for each of the stored video programs, including one or more limits selected from: {an expiration date, a maximum permitted number of repeated viewings} may be established. For example, the user may be charged a fee in exchange for raising one or more of the limits. Further, the desired broadcast video program may be a television series, and the user request may be a single interactive request for storage of a plurality of installments of the series. The content distribution network may include broadband network infrastructure selected from one or more of the following: {cable television network, satellite network, telephone network, wireless network, power line network}. The content distribution network may include packet-switched network infrastructure.

In carrying out the invention in a second alternative approach, a method for providing personal video recorder ("PVR") functionality to a user via a content distribution network is provided. The method comprises receiving a request by the user for storage of desired video content no later than a scheduled telecast to a plurality of viewers of the desired content. The method further comprises, in response to the request only upon the scheduled telecast of the desired content, and only if the user is one of the viewers who is entitled to receive the desired program at the time of the scheduled telecast, storing the desired content in a remote network-based storage facility for the user. The method further comprises making the stored content available to the user over the network with viewing functionality including at least one or more PVR features selected from: {time-shifted viewing, pause, rewind, fast-forward}.

At a more detailed level, the method in the second alternative approach comprehends further features. For example, the request may be received from the user during the scheduled telecast, the user request may be for storage of a not-yet-telecast portion of the desired video content, storing the desired content may comprise storing the portion. For example, the user request may be for rolling storage of currently viewed video content and storing the requested video content may comprise storing most recently viewed video content in a buffer of predetermined length in the remote storage facility. For example, the method may further include non-real-time display for the user of at least some of the desired content during the scheduled telecast of the content, in response to an interactive request of the user. The non-real-time display may include at least one or more viewing modes selected from {pause, rewind, fast forward}.

In carrying out the invention in a third alternative approach, a network-based personal video recording system is provided. The system comprises a network-based storage resource configured to store desired video programming in response to a remote user's electronic request. The system further comprises a content distribution network configured to deliver the stored desired programming to the user. The system automatically performs the storing and delivering of the desired programming under the interactive control of the requesting user, without a need for legal permission from a copyright owner of the desired programming to perform the storing and distributing.

At a more detailed level, the method in the third alternative approach comprehends further features. For example, the automatic storing and delivering of the desired video programming under interactive control of the user may be performed in a manner intended to qualify as a fair use under copyright law.

It is appreciated that in this approach, storing and delivering without a need for legal permission from a copyright owner of the desired programming to perform the storing and distribution means that these actions use the desired programming in a way that those of ordinary skill in the art of copyrights as applied in personal video recording systems would appreciate and understand does not require legal permission. It is further appreciated by those skilled in the relevant arts that the actions use the desired programming in a way that does not require legal permission from a copyright owner of the desired programming and that these actions occur in a particular combination of other structures and functions which include the network-based storage resource and the content distribution network. This approach to carrying out the invention also comprehends performing storing and delivering actions that use the desired programming in a way that those skilled in the relevant arts would appreciate and understand does not give rise to legal liability.

Accordingly, it is to be understood that this approach to carrying out the invention is not to be limited to any specific instance of the factors involved in determining the absence of a need for legal permission, or the absence of legal liability. Rather, this approach to carrying out the invention transcends such specific instances of these factors and should be considered as comprehending the combination of a network-based personal video recording system including a network-based storage resource, and a content distribution network wherein the system performs the actions of storing and delivering in a way that does not require legal permission from a copyright owner in the particular situation at hand as would be readily understood by those skilled in the relevant arts.

Also comprehended is a combination of a network-based personal video recording system including a network-based storage resource, and a content distribution network wherein the system performs the actions of storing and delivering in a way that does not give rise to legal liability in the particular situation at hand as would be readily understood by those skilled in the relevant arts.

One instance of the factors involved in determining the absence of a need for legal permission is the present existing fair use privilege of individuals to take certain actions with content without the need for legal permission. One instance of the factors involved in determining the absence of legal liability occurs in the provisions of the Digital Millennium Copyright Act (DMCA) which shields online service providers from direct, vicarious and contributory liability for content stored at the direction of users.

In carrying out the invention, an automatic buffer enhancement to a file locker-based content storage service is comprehended. This aspect of the invention provides an enhancement to the file locker concept by enabling the user to pause and perform other operations on broadcast programming during the broadcasting thereof. Put another way, operations may be performed on "live" television, that is, on the actual broadcast feed. In this way, the user can personalize the viewing of an otherwise traditionally delivered program by utilizing an automatic buffer enhancement in combination with a file locker architecture. This buffer feature is an enhancement to any other features provided by the file locker implementation, such as any of those features described above.

At a more detailed level, the automatic buffer enhancement aspect of the invention comprehends features and details that may vary depending on the implementation. Exemplary features and details are further described below.

In one aspect of this enhancement to a file locker-based content storage approach, a user is able to ask the system to automatically save a program that the user is currently watching into the user's file locker to facilitate VCR-like control of the program that the user is watching.

For example, a user who has turned on this buffer enhancement feature would cause content to be saved in the user's file locker as the user watched TV. Because the content is being saved in the user's personal file locker, the user would have the ability to pause "live" content and then pick up where the user left off (by viewing the content from the file locker). Similarly, the user would be able to rewind or fast-forward through content based on the amount of material saved in the user's personal file locker.

In an additional aspect of this enhancement to a file locker-based content storage approach, content would not be stored in the user's file locker until the user starts watching a program (unless the content had been requested through the normal mechanisms for the file locker implementation). In yet another aspect, when a user stops watching a given program, the user could have the content automatically saved (in case the user wanted to go back to watch the program again), automatically deleted (to conserve space in the user's file locker), or the user could be prompted to manually determine what should happen to the content when the user stops watching a given program.

BRIEF DESCRIPTION OF THE DRAWINGS

FIG. 2 illustrates the content-storage-request database, file-locker database, and file locker cooperation in more detail;

FIG. 3 illustrates a content storage method in an embodiment of the invention;

FIG. 4 illustrates authentication and viewing of a video program in more detail;

FIG. 5 illustrates a first alternative approach to carrying out the invention;

FIG. 6 illustrates a second alternative approach to carrying out the invention;

FIG. 7 illustrates a third alternative approach to carrying out the invention.

DETAILED DESCRIPTION OF THE PREFERRED EMBODIMENT

Figure 1:
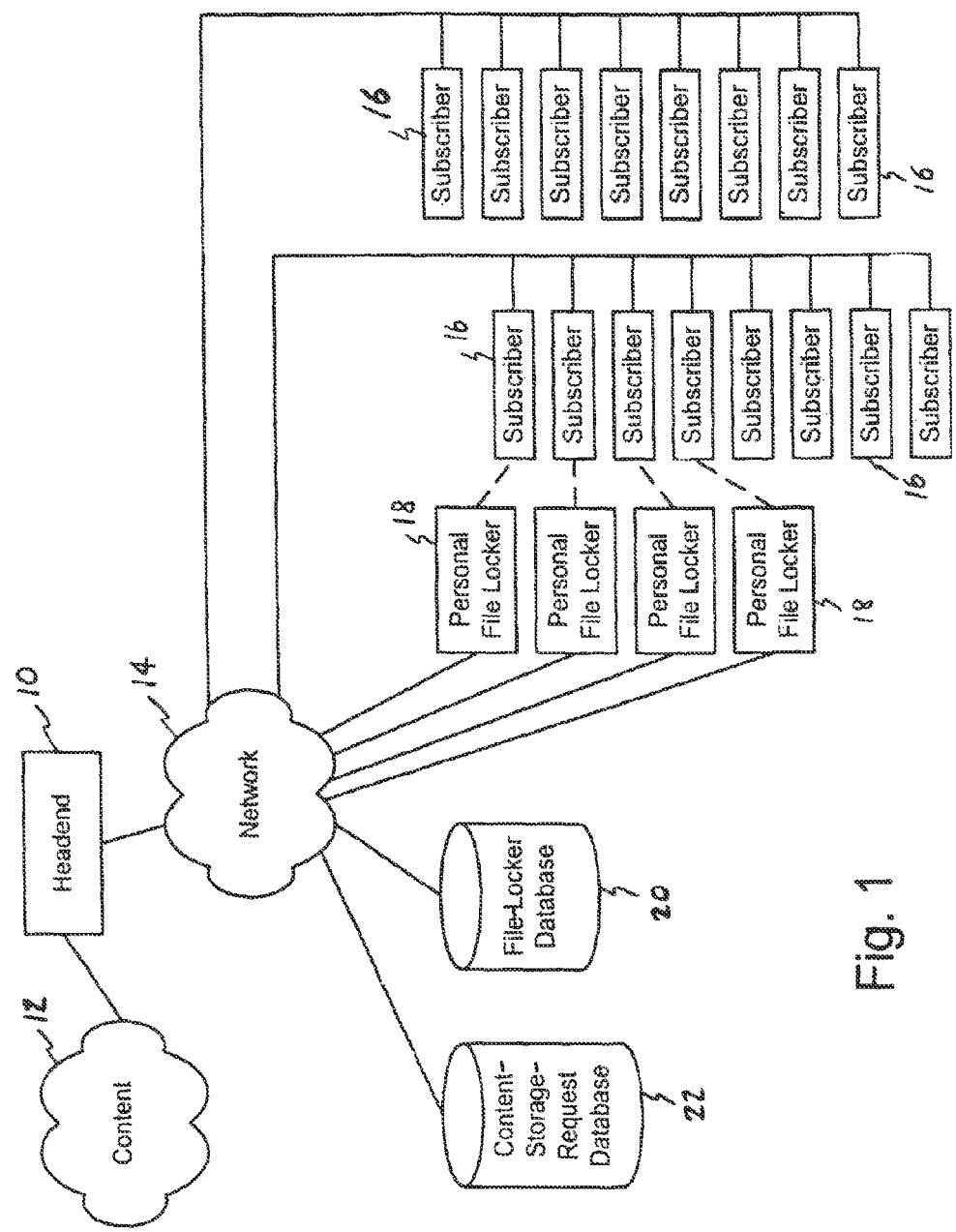
FIG. 1 is a content distribution network and content storage system in an embodiment of the invention.

With reference to FIGS. 1 and 2, a content distribution network and content storage system in an embodiment of the invention are illustrated. Signals are distributed by headend 10. Headend 10 receives content from source 12. The distribution network 14 is shown in a simplified fashion with the final signal distribution reaching subscribers 16. A user or subscriber 16 has a personal file locker 18 on the network 14. This file locker-based content storage system implementation further includes file-locker database 20 and content-storage-request database 22. Headend 10 provides broadcast video programming over network 14 to users 16 in accordance with a broadcasting schedule. A personal file locker 18 is established for each user 16 and includes network storage space allocated for personal use by the user. Content-storage-request database 22 tracks requests by the users for placing broadcast video programs into the users' file lockers 18. More specifically, a specific user's requested content is stored in that user's file locker upon broadcast thereof and is thereafter made available to that user.

The personal file locker may be established in any suitable fashion such as a directory or other file system/volume construct that is created to hold the user's content. A database entry in the file-locker database 20 notes details of the file locker. This is best illustrated in FIG. 2 where each block 30 represents a file-locker description entry within file-locker database 20. As shown, each file-locker description 30 corresponds to a particular personal file locker 18, which in turn corresponds to a particular user or subscriber 16.

Content-storage-request database 22 may be established in any suitable way. As best shown in FIG. 2, in the illustrated embodiment, content-storage-request database 22 has entries 32 corresponding to scheduled video programs. A content-storage request by a user results in the addition of a pointer 34 to the content-storage-request database entry for the requested program.

As shown in FIG. 2, when a subscriber 16 requests a particular video program for placement in the subscriber's personal file locker 18, a pointer 34 is added in the entry 32 for the particular video program within the content-storage-request database 22. The added pointer points to the file-locker description 30 for the personal file locker 18 for the subscriber 16 making the request. Further, the subscriber's entry in the file-locker database 20 is annotated so that the requests for any particular file locker may be tracked within the corresponding file-locker description in file-locker database 20. In the approach just described, a request by the user to delete a previous content-storage request is handled by removing the previously added pointer and removing the corresponding annotation to the file-locker description.

As mentioned, the video program 32 is stored to the user's file locker 18 upon the general making of the video program available to the end user in any fashion, for example, when the video program is broadcasted. The file locker-based approach provided by the illustrated embodiment provides flexibility and economy of scale by implementing a personal file locker for the user on the network. Personal file lockers 18 on network 14 provide the flexibility and economy of scale of a network solution, while at the same time, providing the personal feel of an in-home solution and avoiding some limitations typically associated with a content license management approach.

With regard to the storing of the programs in the file lockers, any suitable data storage technique may be utilized to effectively get the data available at the appropriate file lockers. Once data is stored in a file locker, access requests to view the contents are authenticated to assure that contents of a file locker are handled as personal-use copies for the associated subscriber. During playback of content from the file locker, the subscriber may utilize pause, rewind, and fast forward features while viewing.

In the implementation of the illustrated embodiment, the customer subscribes to the file-locker service and specifies or selects an amount of storage (expressed in Gigabytes, hours of video content, and/or number of shows) for his/her personal file locker 18. With a file locker established, the subscriber is able to request that content be placed in his/her personal file locker 18. Only content that is available to the subscriber on his/her television (or other devices receiving broadcast content such as computers) can be placed in his/her file locker 18. Access to the file locker 18 is restricted to the subscriber, and optionally, further restricted to the subscriber's premises (but could allow viewing from any of the televisions, computers, or other video display devices). Various techniques are contemplated for the subscriber to control content within the file locker. That is, the subscriber can direct content additions to his/her file locker using a web interface, and/or a television-based interface. Content that the user has requested is stored in his/her personal file locker. This content counts against the amount of storage associated with the subscription to the service.

When content is stored in a service user's file locker, it becomes available for the user to watch. The user can also direct content deletions from the file locker to free up space. In another aspect, the user may be able to set up expiration dates for content, essentially requesting that the system remove content after a certain period of time to preserve free space inside the file locker. The user may be able to specify rules for the automated management of the file locker in another aspect of the invention, for example, what should happen when the file locker does not have enough space to store a program that the user has requested.

When the user selects a piece of content from the file locker for viewing, the user is able to watch it very much the way that he/she would be able to watch VCR or PVR recorded content. For example, fast forward, rewind, pause, and other viewing commands may be available to the user.

With reference to FIGS. 3 and 4, further details of the technical aspects of the illustrated embodiment are explained below. In FIG. 3, the content storage method in an embodiment of the invention is illustrated. At block 40, the file-locker database is established. At block 42, the content-storage-request database is established. At block 44, a personal file locker is established on the network for a user. More specifically, when a user signs up for the file-locker service, the system sets up a file locker and reserves storage space for it. The content-storage-request database tracks which users have requested which programs be placed in their respective file lockers. A web or television interface that allows users to request content only allows a user to request content that the user is entitled to access as part of his/her normal video subscription.

According to the database of user content requests, the system stores the requested content when it is broadcast. For example, if the user requests that the 6:00 p.m. news on channel 7 be saved in the user's file locker, the 6:00 p.m. news is stored in the locker, ideally in real time starting at 6:00 p.m. The content becomes available to the user as soon as it is stored in the user's file locker.

If a number of users request the same content, the system may store a separate copy in each requesting user's file locker. If a user unsubscribes from the file-locker service, the user's file locker is deallocated and any content in it is deleted. In addition, the database entry in the file-locker database is deleted or marked inactive.

When a content storage request is received from the user, first a check is made to see if the user's file locker has enough space to store the selected content. The check considers the current amount of space available, any pending content storage requests, and any storage management policies in place for that file locker. If sufficient space is available, a pointer is added for the given program that points to the file-locker database entry for the file locker of the subscriber making the request. The subscriber's record in the file-locker database is also annotated.

In FIG. 3, blocks 46 and 48 illustrate adding pointers to the content-storage-request database entries in response to user requests and annotating file-locker database entries to note the pointers. This concept is also illustrated in FIG. 2 where content-storage-request database 22 includes video programs 32 where pointers 34 point to file-locker descriptions 30 corresponding to personal file lockers 18 that correspond to subscribers 16.

At block 50 user requests/pointers are tracked and video programs are stored to file lockers. More specifically, the content-storage-request database is monitored. Each time a program begins (based on EPG data or other sources including human input), each file locker that is listed as having requested that content is given a copy of the program. The program may be stored in the file lockers in real-time by streaming into a file in each locker, or the program may be copied in large blocks to each locker at the end of the program's broadcast. In no case is content available to the user from the file locker prior to broadcast or the otherwise general availability of the content. In the case where the content is available only in analog format, it is first digitally encoded and then stored in the file locker.

In the case where the content is digitally encrypted, it is stored in encrypted form in the file locker. This encryption may be the default encryption or the content may be encrypted using an encryption system more appropriate for stored content.

At block 52, stored video programs in a user's file locker are made available to the user for viewing. More specifically, when a request is made to view a piece of content in a file locker, the request is first authenticated to identify which subscriber is making the request. This is illustrated in more detail in FIG. 4 where block 54 illustrates authentication and block 56 illustrates providing the video program for viewing. Only content that is in a particular subscriber's file locker is available to that subscriber for viewing. Assuming that the content requested is in the authenticated user's file locker, the content is transmitted to the user. The user is able to use VCR or PVR commands including pause, fast forward, and rewind while viewing the content. When reaching the end of the content or pressing stop, the user may be asked whether he/she would like to remove the content from his/her file locker.

In the preferred implementation, when a file is stored in a user's file locker, if there is not enough space for the file, the system may remove files using criteria set up by the user in order to make enough space for the new file. Such criteria may include the age of the other files, whether the files have been accessed recently, and the size of the files.

There are also several optional improvements that may further be incorporated into embodiments of the invention. These optional improvements relate to the way that programs are stored in a user's file locker.

One optional improvement to the implementation is to implement a file system that recognizes multiple files with the same content being stored and efficiently stores them to reduce the redundant use of storage space. With the exception of performance, this file system behaves exactly as a traditional file system would behave. The differences are indistinguishable to the user except that it delivers a greater level of performance at a lower cost. Ideally this file system would identify duplicate file storage requests through specified similarities in meta data associated with the file, for example, file name. An alternative is to enable bulk versions of traditional file system operations (such as file open, file write, etc.) that operate on multiple files simultaneously. In this way, the system could easily identify which files contained identical data and optimization of applications using the file system would be enhanced by reducing the number of file operations/procedure calls that are required. In any case, files, whether manipulated in bulk or individually, would always behave as if they were independent files.

Another optional improvement to the implementation is to allow the system to automatically expand a user's file locker to accommodate content that the user has requested. The user may be charged additional fees based on the total amount of storage used. This would change the implementation above in that instead of ensuring that a user does not exceed a given amount of space, a log or other mechanism would be kept so that the maximum amount of storage used by a user during a time period (e.g., a month) could be ascertained for billing purposes.

It is appreciated that embodiments of the invention provide an improved content storage system and method. As exemplified by the illustrated embodiment, the personal file locker on the network provides improvements over existing PVR by providing added flexibility and economy of scale while taking a personal-use approach that may avoid some difficulties encountered in a rights-management license approach.

In addition to the file locker approach embodiment illustrated in FIGS. 1-4, there are additional alternative approaches illustrated in FIGS. 5-7.

In FIG. 5, a method for time-shifted viewing of content for use in a content distribution network is illustrated. The content distribution network delivers a plurality of broadcast video programs over the network to a plurality of viewers in accordance with a broadcast schedule. At block 60, a remote personal storage resource is allocated on the network for a user. At block 62, a request by the user for storage of a desired one or more of the broadcast video programs is received. At block 64, only if the request is received no later than a scheduled broadcast of the desired program, in response to the request, the desired video program is automatically stored in the user's remote personal storage resource upon the scheduled broadcasting of the desired video program. At block 66, the stored video program is automatically made available to the user over the network for viewing at a subsequent time specified by the user.

In FIG. 6, a method for providing personal video recorder (PVR) functionality to a user via a content distribution network is illustrated. At block 70, a request by the user for storage of desired video content is received. The request is received no later than a scheduled telecast to a plurality of viewers of the desired content. At block 72, in response to the request, only upon the scheduled telecast of the desired content, and only if the user is one of the viewers who is entitled to receive the desired program at the time of the scheduled telecast, the desired content is stored in a remote network-based storage facility for the user. At block 74, the stored content is made available to the user over the network with viewing functionality including at least one or more PVR features selected from: {time-shifted viewing, pause, rewind, fast-forward}.

In FIG. 7, a network-based personal video recording system carries out the illustrated actions in blocks 80 and 82. At block 80, desired video programming is stored in response to a remote user's electronic request. A content distribution network is configured to deliver the stored desired video programming to the user. At block 82, the system automatically performs the storing and delivering of the desired programming under the interactive control of the user, without a need for legal permission from a copyright owner of the desired programming to perform the storing and distributing.

It is appreciated that the additional alternative approaches illustrated in FIGS. 5-7 may involve additional features at the more detailed level. Further, it is appreciated that various approaches to carrying out the invention to achieve various independent alternative embodiments of the invention are described above. The invention as a whole comprehends various different alternative and independent approaches for carrying out the various concepts involved, and the invention may be instantiated in various ways to achieve various embodiments, including the particular embodiments described above and illustrated in the drawings, as well as other embodiments of any of the innovative concepts presented.

Figure 8:
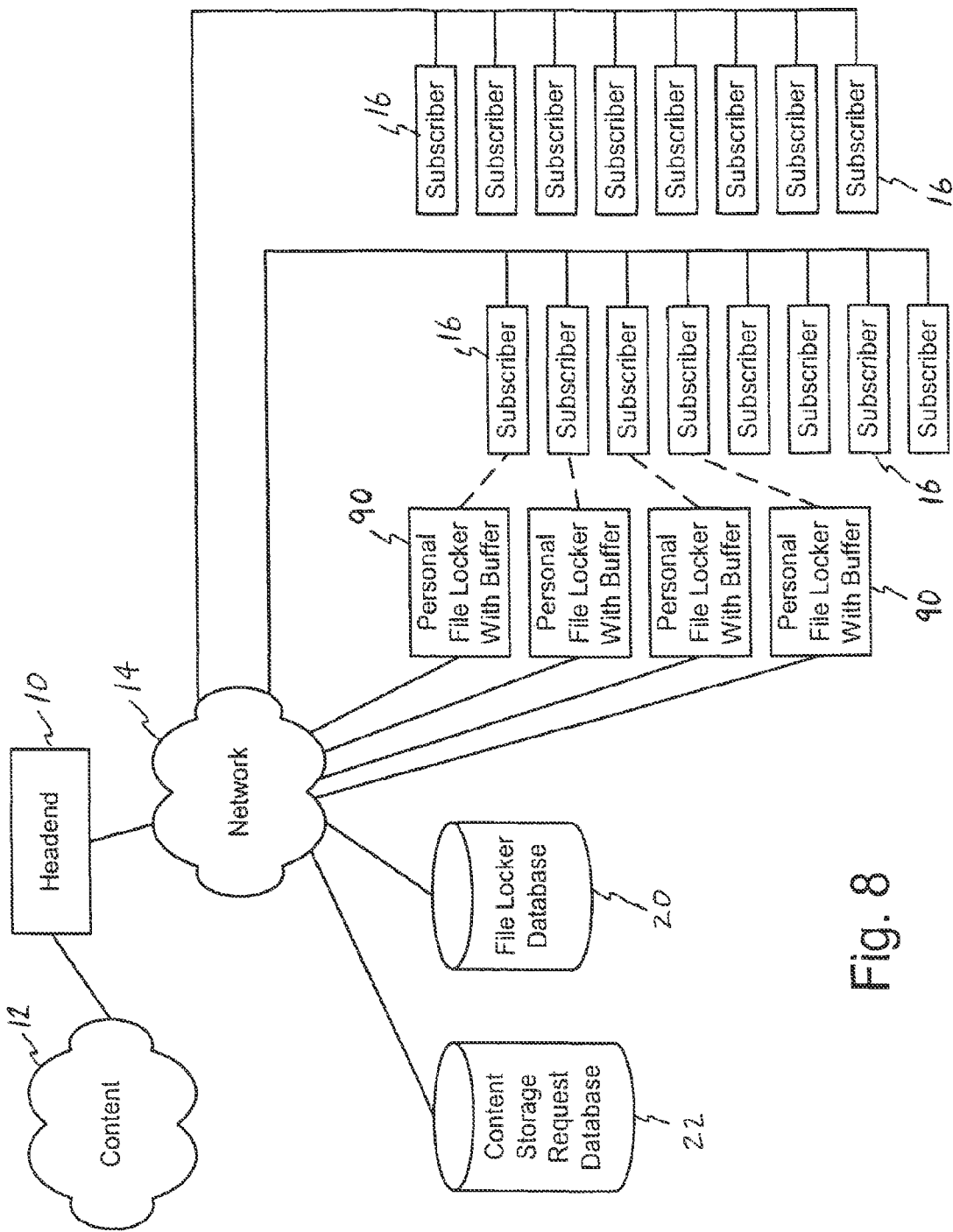
FIG. 8 is a content distribution network and content storage system in an embodiment of the invention including the automatic buffer enhancement in combination with a file locker architecture.
Figure 9:
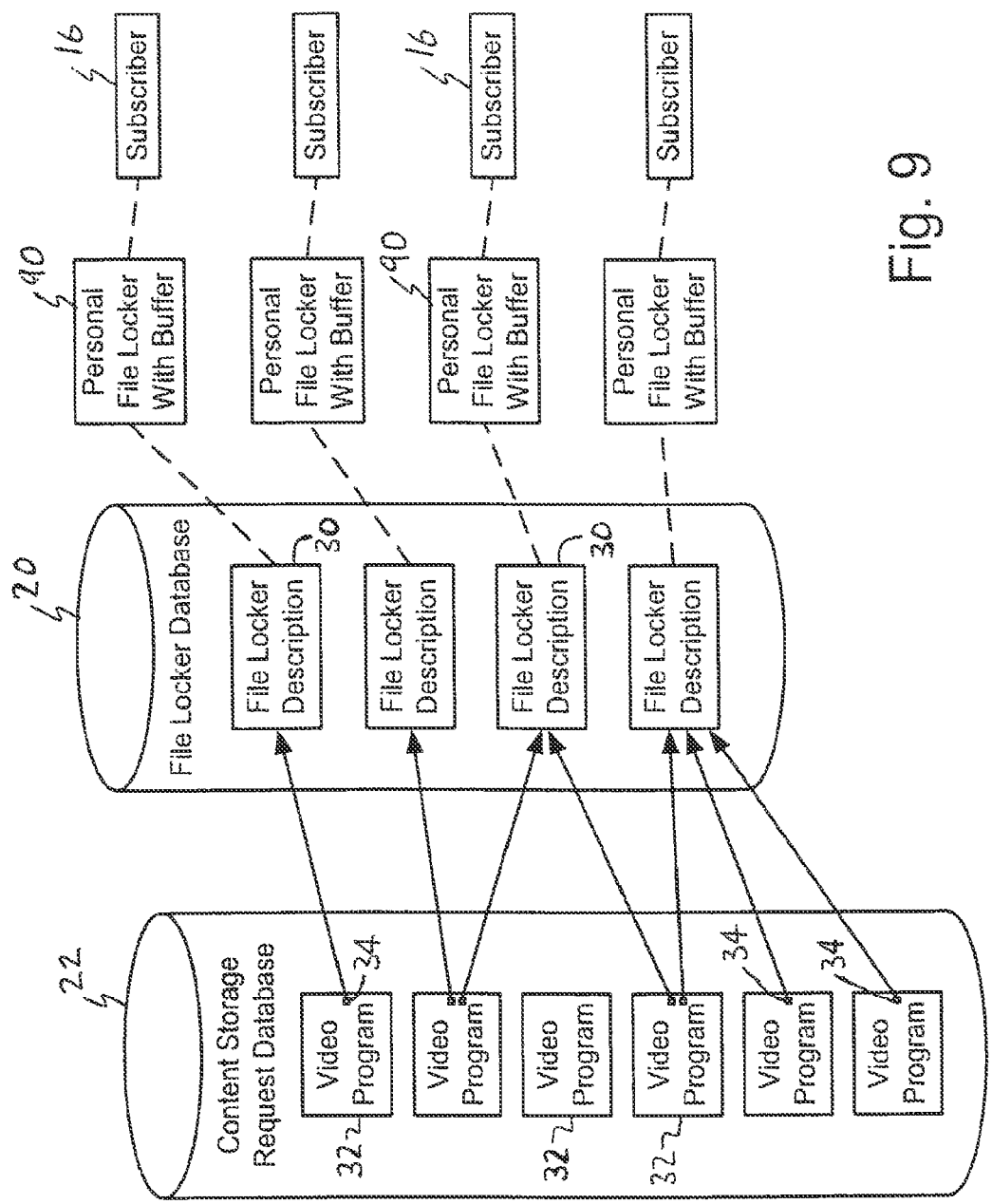
FIG. 9 illustrates the content-storage-request database, file-locker database, and file locker cooperation in more detail in an embodiment of the invention including the automatic buffer enhancement in combination with a file locker architecture.

Also comprehended by the invention is an automatic buffer enhancement to a file locker-based content storage service. FIGS. 8-9 illustrate a content distribution network and content storage system in an embodiment of the invention which includes an automatic buffer enhancement. As shown, signals are distributed by headend 10. Headend 10 receives content from source 12. The distribution network 14 is shown in a simplified fashion with the final signal distribution reaching subscribers 16. A user or subscriber 16 has a personal file locker 90 on the network 14. Each file locker 90 includes a buffer enhancement.

This file locker-based content storage system implementation further includes file-locker database 20 and content-storage-request database 22.

The embodiment shown in FIGS. 8-9 provides an enhancement to the file locker concept by enabling the user to pause and perform other operations on broadcast programming during the broadcast thereof. Operations may be performed on "live" television. In this way, the user can personalize the viewing of an otherwise traditionally delivered program by utilizing an automatic buffer enhancement in combination with a file locker architecture. Personal file lockers 90 include the buffer enhancement. This buffer feature is an enhancement to any other features provided by the file locker implementation, such as any of those features described above.

With continuing reference to the illustrated embodiment of FIGS. 8-9, a user who has enabled the buffer enhancement feature would cause content to be saved in the user's file locker 90 as the user watched television. It is appreciated that this content is "live" television, that is, the actual broadcast feed.

Because the content is being saved in the user's personal file locker, the user has the ability to pause "live" content and then pick up where the user left off (by viewing the content from the file locker). Similarly, the user would be able to rewind or fast forward through content based on the amount of material saved in the user's personal file locker. Thus, when the buffer enhancement feature of file locker 90 is enabled, the broadcast program content being viewed by the user passes through the user's personal file locker 90. The buffering at file locker 90 allows the user to personalize the viewing of an otherwise traditionally delivered program by using, pause, rewind, and fast-forward features.

Typically, content would not be stored in the user's file locker 90 until the user started watching a program unless the content had been requested through the normal mechanisms of the file locker architecture. When a user stops watching a given program, the user could have the content automatically saved (in case the user wanted to go back to watch it again), automatically deleted (to conserve space in the user's file locker) or the user could be prompted to manually determine what should happen to the content.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    establishing a pause buffer for future recording of live programming;
    establishing a scheduled recording buffer for future scheduled recording of programming for a first user;
    providing the first user, at a first user premises, a control for allocating buffer space to the pause buffer and the scheduled recording buffer, wherein the pause buffer and the scheduled recording buffer comprise storage provided by a network computing device that is remote from the first user premises;
    recording a live programming of a first program as it is consumed by the first user by storing in the pause buffer a first copy of a portion of the first program;
    expanding the pause buffer to accommodate recording of the live programming of the first program as it is consumed by the first user, wherein the expanding the pause buffer comprises increasing storage provided to the first user;
    receiving an indication that the first user has stopped consuming the live programming of the first program;
    automatically retaining contents of the pause buffer after the first user has stopped consuming the live programming of the first program;
    storing a second copy of the portion of the first program in a second buffer for a second user;
    restricting access so that the contents of the pause buffer can only be accessed from the first user premises and the contents of the second buffer can only be accessed from a second user premises, wherein the first user premises are different from the second user premises; and
    further restricting access to the contents of the pause buffer based on determining that the first user has viewed the contents of the pause buffer a maximum threshold number of times.

2. The method of claim 1, wherein providing the first user the control further comprises providing an option to enable the pause buffer for subsequent recording of live programming as it is consumed.

3. The method of claim 1, further comprising using the network computing device to maintain a plurality of pause buffers for a plurality of users, and using the plurality of pause buffers to allow the plurality of users to pause live programming as they are consuming the live programming, and to resume consumption.

4. The method of claim 1, wherein providing the first user the control further comprises providing the first user with an option to deactivate the pause buffer.

5. The method of claim 1, further comprising reserving a predetermined amount of a network storage space for each of a plurality of users, and allowing each of the plurality of users to indicate how much of their reserved space will be used as a corresponding pause buffer, and how much will be used as a corresponding scheduled recording buffer.

6. The method of claim 5, further comprising removing content stored in the predetermined amount of the network storage space reserved for each of the plurality of users based on an expiration date.

7. The method of claim 5, further comprising storing duplicate copies of a first program in the network storage space for two or more of the plurality of users.

8. The method of claim 1, further comprising:
tracking an amount of storage space allocated as a result of the expanding of the pause buffer assigned to the first user; and
generating billing information based on the amount of storage space allocated.

9. The method of claim 1, wherein the live programming, when viewed by the first user, passes through the pause buffer.

10. The method of claim 1, wherein the restricting access so that the contents of the pause buffer can only be accessed from the first user premises further comprises restricting access so that the contents of the pause buffer can only be accessed from the first user premises by the first user.

11. The method of claim 1, wherein the restricting access so that the contents of the pause buffer can only be accessed from the first user premises further comprises restricting access so that the contents of the pause buffer can be accessed from one or more devices at the first user premises.

12. A method comprising:
assigning, by a computing device, a predetermined amount of a storage space to each of a plurality of remote users;
offering each of the plurality of remote users an option to dynamically allocate a first portion of their assigned storage space to function as a pause buffer for future recording of live programming, and a second portion of their assigned storage space to serve as a scheduled recording buffer for future scheduled recording of programs;
expanding a first pause buffer assigned to a first remote user of the plurality of remote users to accommodate recording of a live programming as it is consumed by the first remote user by increasing the storage space assigned to the first remote user, wherein the first remote user is associated with a first remote user premises; receiving an indication that the first remote user has stopped consuming the live programming;
automatically retaining contents of the first pause buffer after the first remote user has stopped consuming the live programming;
recording in a second pause buffer assigned to a second remote user of the plurality of remote users the live programming as it is consumed by the second remote user, wherein the second remote user is associated with a second remote user premises different from the first remote user premises;
restricting access so that the contents of the first pause buffer can only be accessed from the first remote user premises and the contents of the second pause buffer can only be accessed from the second remote user premises; and
further restricting access to the contents of the pause buffer based on determining that the first user has viewed the contents of the pause buffer a maximum threshold number of times.

13. The method of claim 12, further comprising:
maintaining a plurality of network pause buffers for the plurality of remote users, each network pause buffer recording the live programming as it is remotely consumed by a corresponding one of the plurality of remote users.

14. The method of claim 12, further comprising:
receiving a request from the first remote user to deactivate the first pause buffer; and
stopping the first pause buffer from operating.

15. The method of claim 12, further comprising removing content stored in the predetermined amount of the storage space assigned to each of the plurality of remote users based on an expiration date.

16. The method of claim 12, wherein the restricting access so that the contents of the first pause buffer can only be accessed from the first remote user premises further comprises restricting access so that the contents of the first pause buffer can only be accessed from the first remote user premises by the first remote user.

17. A method comprising:
assigning, at a device, a predetermined amount of a storage space to each of a plurality of remote users;
offering, at the device, each of the plurality of remote users an option to allocate a first portion of their assigned storage space to function as a pause buffer for future recording of live programming, and a second portion of their assigned storage space to serve as a scheduled recording buffer for future scheduled recording of programs;
expanding a first pause buffer assigned to a first remote user of the plurality of remote users to accommodate recording of a live programming as it is consumed by the first remote user by increasing the storage space assigned to the first remote user, wherein the first remote user is associated with a first remote user premises;
recording in a second pause buffer assigned to a second remote user of the plurality of remote users the live programming as it is consumed by the second remote user, wherein the second remote user is associated with a second remote user premises different from the first remote user premises;
restricting access so that contents of the first pause buffer can only be accessed from the first remote user premises and the contents of the second pause buffer can only be accessed from the second remote user premises; and
further restricting access to the contents of the pause buffer based on determining that the first user has viewed the contents of the pause buffer a maximum threshold number of times.

18. The method of claim 17, wherein the live programming passes through the first pause buffer assigned to the first remote user as it is consumed by the first remote user.

19. The method of claim 17, wherein the restricting access so that the contents of the first pause buffer can only be accessed from the first remote user premises further comprises restricting access so that the contents of the first pause buffer can only be accessed from the first remote user premises by the first remote user.

* * * * *